March 30, 1965     E. LOOS     3,176,055

PLASTIC BOAT HULL

Filed Feb. 2, 1962

Inventor
Edward Loos
By Stevens, Davis, Miller & Mosher
Attorneys

United States Patent Office 3,176,055
Patented Mar. 30, 1965

3,176,055
PLASTIC BOAT HULL
Edward Loos, 503 E. 19th Ave., Vancouver,
British Columbia, Canada
Filed Feb. 2, 1962, Ser. No. 170,546
Claims priority, application Canada, Nov. 16, 1961,
836,229
1 Claim. (Cl. 264—45)

My invention relates to hollow structures comprising inner and outer plastic shells fastened to a frame and having a filling of plastic foam therebetween.

In particular, my invention may be used in the manufacture of large structures such as boat hulls, truck bodies, trailer bodies or wall panels.

Known methods of manufacturing such structures have required the molding of the inner and outer shells. This method of construction involves the use of expensive male and female molds.

Another method of construction consists in spraying an air setting plastic material onto a form. This too requires costly specialized equipment.

It has also been proposed to construct a boat hull or similar structure by securing a plurality of wood strips together in edge to edge relationship on templets, to form the desired shape and applying an interior and exterior coat of plastic material. One disadvantage of this method is that templets are required on which the structure is formed. Another disadvantage is that securing the wood strips together in edge to edge relationship is a time consuming operation.

A feature of my invention is that large structures can be constructed without the aid of male or female molds, templets or like devices. Another feature of this invention is that no special tools, such as plastic spraying apparatus are required.

Other features of my invention are the provision of a plastic boat hull which is strong, watertight, buoyant, durable and light in weight.

My invention provides a structure comprising, a rigid frame, an inner and an outer shell of plastic sheets fastened to said frame and plastic foam filling the space between said inner and outer shells.

In the drawings which illustrate an embodiment of the invention:

Figure 1:
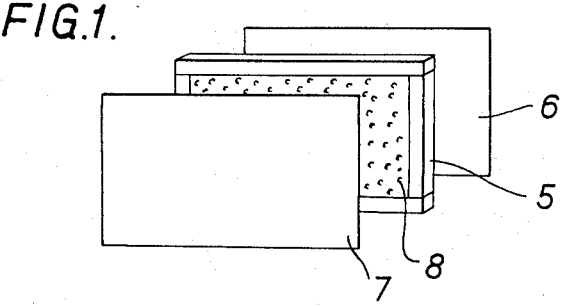
FIG. 1 is an exploded view of a panel constructed in accordance with my invention.

As shown in FIG. 1 of the drawings, the structure includes a frame 5 to which glass reinforced plastic sheets 6 and 7 are attached by means of screws or nails. The space between the inner and outer shells is filled with plastic foam 16.

Figure 2:
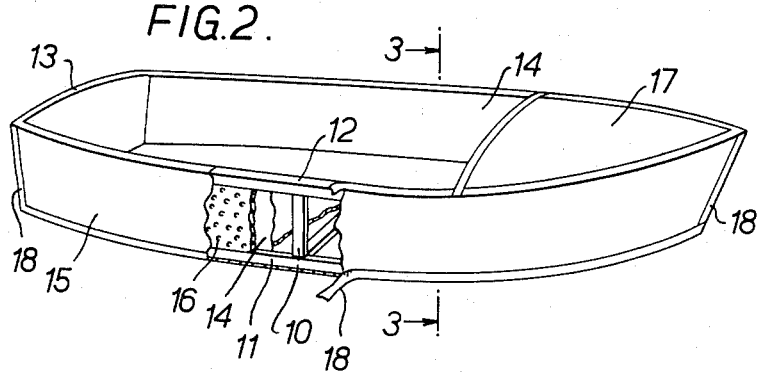
FIG. 2 is a perspective view partly in section, of a boat hull constructed in accordance with my invention.

As shown in FIG. 2 the boat hull includes transverse frame members 10 and longitudinal frame members, chines 11 and sheers 12. An inner shell 14 and a corresponding outer shell 15 constructed of glass reinforced plastic sheets, are fastened to the frame members. The space between the inner and outer shells is filled with plastic foam 16. The boat is provided with a transom 13 in the usual manner.

Figure 3:
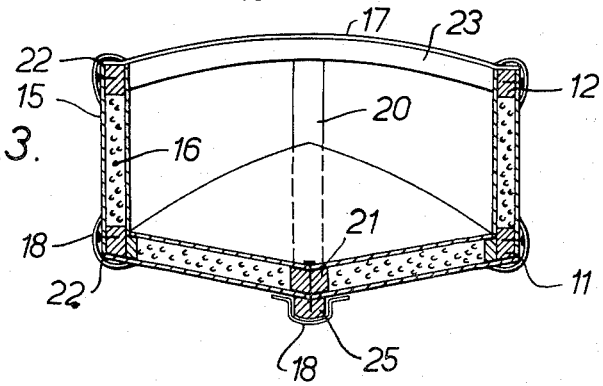
FIG. 3 is a sectional view along the line 3—3 of FIG. 2.

The deck 17 is also formed of a glass reinforced plastic sheet attached to deck beam 23 as shown in FIG. 3. Resin saturated glass mat 18 has been used to seal all joints 22 in the hull.

In accordance with my invention a boat hull as shown in the drawings is constructed by first building a frame in the conventional manner. Chines 11 and sheers 12 are fastened at one end to the transom 13 and at the other end to a stem 20. An inner keel 21 is fastened to the stem 20 and the transom 13. The transverse frame members 10 are positioned between the chines 11 and sheers 12 and between the chines 11 and the inner keel 21. The frame is formed to give the hull the desired shape.

When the framework has been completed it is then planked using sheets of glass reinforced plastic. The sheets are attached to the frame by means of nails or screws to form an outer shell 15.

The thickness of sheets used depends on the size of the boat hull to be built and the strength of the frame. It has been found that 6 ounce glass reinforced plastic sheets are suitable for constructing a boat hull 12 feet in length having two transverse frame members 10.

After the plastic sheets forming the outer shell 15 have been attached to the frame the reinforced plastic sheets forming the inner shell 14 are attached in a similar manner.

Figure 4:
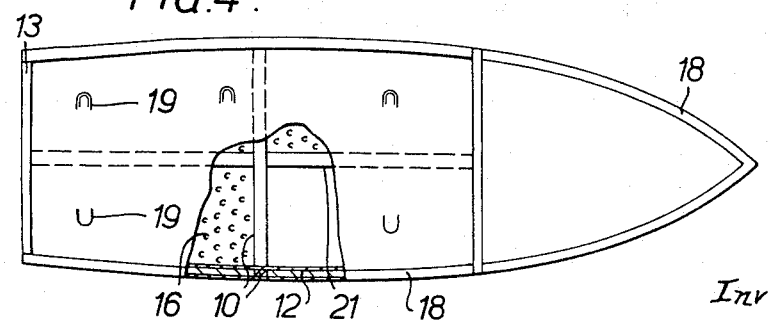
FIG. 4 is a top plan view partly in section of the boat hull shown in FIG. 2.

Flaps 19 as shown in FIG. 4 are then cut in the inner shell 14 to facilitate pouring a foam-in-place plastic into the space between the inner shell 14 and the outer shell 15. As joints 22 in the shell 15 have not as yet been sealed air trapped between the inner and outer shells escapes at the joints as the foam 16 fills the space.

The next step is to abrade the surface of the plastic sheets adjacent the joints 22. It is necessary to roughen the surface of the plastic and remove any traces of lubricants used during the pressing operation in forming the sheets as this will interfere with the bonding of the resin saturated glass mat 18 to the reinforced plastic sheets.

The glass mat 18 used to seal the joints 22 preferably contains 6 ounces of glass fiber per square foot and is six inches wide. The glass mat 18 is laid along the abraded area adjacent the joint 22. The glass mat 18 is then thoroughly saturated with an air setting resin and allowed to harden. All joints including those between the transom and the outer shell 15 are sealed in a similar manner.

The joints in the inner shell are sealed using resin saturated glass mat. It is also necessary to seal flaps 19 using appropriate sized pieces of resin saturated glass mat.

If a deck 17 as shown in FIG. 1 is desired it is constructed of a glass reinforced plastic sheet fastened to suitable deck beams 23. Joints between the deck 17 and the outer shell 15 are sealed using resin saturated glass mat as described above.

An outer keel 25 is provided on the outer shell 14. The outer keel 25 is attached by means of screws or nails to inner keel 21. Glass mat 18 is laid over the outer keel 25 and saturated with resin as described above.

I claim:
A process for manufacturing a final-shaped and precise- ly dimensioned structural shell from synthetic plastic materials without use of a mold, comprising the steps of:
  (a) providing a rigid skeletal framework whose outline conforms to the desired final shape of the shell;
  (b) planking said frame by attaching inner and outer reinforced plastic glass sheets to inner and outer sides of said framework so as to enclose said framework between said sheets and whereby a hollow compartment is formed between said inner and outer sheets;
  (c) cutting a temporary access in said sheets leading into said compartment;
  (d) introducing a "foam-in-place" plastic material in said compartment through said access so as to fill said compartment with said plastic material; and,
  (e) sealing said access.

References Cited by the Examiner

UNITED STATES PATENTS

| | | | |
|---|---|---|---|
| 2,552,641 | 5/51 | Morrison | 156—78 |
| 2,582,228 | 1/52 | Brinkema. | |
| 2,866,985 | 1/59 | Blackmore | 9—6 |
| 2,903,380 | 9/59 | Hoppe. | |
| 3,007,208 | 11/61 | Urban | 9—6 X |
| 3,013,922 | 12/61 | Fisher | 156—79 X |
| 3,080,267 | 3/63 | Schmalz. | |
| 3,083,665 | 4/63 | Steidley. | |

EARL M. BERGERT, *Primary Examiner.*